(12) United States Patent
Kim et al.

(10) Patent No.: US 7,090,359 B2
(45) Date of Patent: Aug. 15, 2006

(54) SCROLLING UNIT, COLOR ILLUMINATING SYSTEM, AND PROJECTION SYSTEM USING THE SCROLLING UNIT

(75) Inventors: Dae-sik Kim, Suwon-si (KR); Kun-ho Cho, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 11 days.

(21) Appl. No.: 10/788,406

(22) Filed: Mar. 1, 2004

(65) Prior Publication Data

US 2004/0227903 A1  Nov. 18, 2004

(30) Foreign Application Priority Data

Feb. 28, 2003 (KR) .................. 10-2003-0012697

(51) Int. Cl.
G03B 21/14 (2006.01)
G02B 26/10 (2006.01)
H04N 9/14 (2006.01)

(52) U.S. Cl. .................. 353/102; 353/31; 353/84; 359/197; 359/203; 359/210; 348/742

(58) Field of Classification Search ............ 353/31–33, 353/20, 84, 81, 122, 101; 359/196–198, 359/203, 201, 209, 210; 348/742, 743, 750, 348/756

See application file for complete search history.

(56) References Cited

U.S. PATENT DOCUMENTS 6,288,815 B1 * 9/2001 Lambert ................. 359/196
6,334,685 B1 * 1/2002 Slobodin ................. 353/31
6,765,705 B1 * 7/2004 Ouchi .................. 359/216
6,877,860 B1 * 4/2005 Cho et al. ................. 353/31
6,921,171 B1 * 7/2005 Lee et al. ................. 353/31
2001/0038483 A1 11/2001 Lambert
2002/0057402 A1 5/2002 Um
2004/0021944 A1 2/2004 Kim et al.
2004/0233342 A1 * 11/2004 Kim et al. ................. 349/6
2005/0012904 A1 * 1/2005 Kim et al. ................. 353/31

FOREIGN PATENT DOCUMENTS

| EP | 0 798 587 A2 | 10/1997 |
| EP | 1 359 452 A1 | 11/2003 |
| JP | 08-190080 A | 7/1996 |
| JP | 10-62775 A | 3/1998 |
| JP | 2002-40416 A | 2/2002 |
| JP | 2002-328332 A | 11/2002 |
| JP | 2002-541512 A | 12/2002 |

* cited by examiner

Primary Examiner—W. B. Perkey
Assistant Examiner—Andrew Sever
(74) Attorney, Agent, or Firm—Sughrue Mion, PLLC

(57) ABSTRACT

A scrolling unit for forming a color image through scrolling, and a color illuminating system and a projection system using the scrolling unit. The scrolling unit includes a first spiral lens disk, a second spiral lens disk, and a glass rod. The first spiral lens disk includes a plurality of cylindrical lens cells arranged in a spiral pattern and can be rotated. The second spiral lens disk is installed facing the first spiral lens disk and can be rotated at the same speed as the first spiral lens disk. The projection system includes a light source, an optical splitter for splitting light into light beams having different colors, and a scrolling unit that scrolls the light beams by periodically changing paths on which the light beams proceed. Also included is a light valve for forming an image, and a projection lens unit for enlarging and projecting the image.

21 Claims, 16 Drawing Sheets

SCROLLING UNIT, COLOR ILLUMINATING SYSTEM, AND PROJECTION SYSTEM USING THE SCROLLING UNIT

BACKGROUND OF THE INVENTION

This application claims the priority of Korean Patent Application No. 2003-12697, filed on Feb. 28, 2003, in the Korean Intellectual Property Office, the disclosure of which is incorporated herein by reference.

1. Field of the Invention

An apparatus consistent with the present invention relates to a scrolling unit which implements scrolling using two spiral lens disks, thereby increasing light efficiency and decreasing a necessary space for installation, and a color illuminating system and a projection system which use the scrolling unit.

2. Description of the Related Art

Projection systems are divided into a three-panel type and a single-panel type according to the number of light valves which control light emitted from a high-output lamp light source to be turned on or off in each pixel. A single-panel projection system has a smaller optical structure than a three-panel projection system but has only ⅓ of the light efficiency of the three-panel projection system because it splits white light into red (R), green (G), and blue (B) light beams using a sequential method. Accordingly, research and development have been performed to increase light efficiency of single-panel projection systems.

A general single-panel panel projection optical system splits light emitted from a white light source into R, G, and B light beams using a color filter, sequentially transmits the R, G, and B light beams to a light valve, and operates the light valve according to the order of color to form an image. Since such a single-panel optical system uses colors sequentially, the light efficiency of the single-panel optical system is only ⅓ of that of a three-panel optical system. To overcome this problem, a scrolling method has been proposed. According to a color scrolling method, white light is split into R, G, and B light beams, and the R, G, and B light beams are simultaneously transmitted to different positions on a light valve. In addition, because an image can be formed only when all of the R, G, and B light beams reach each pixel, color bars are moved at a predetermined speed using a particular method.

As shown in FIG. 1, in a conventional single-panel scrolling projection system, white light emitted from a light source 100 passes through first and second lens arrays 102 and 104 and a polarized beam splitter array 105 and is split into R, G, and B light beams by first through fourth dichroic filters 109, 112, 122, and 139. For example, the R and G light beams are transmitted by the first dichroic filter 109 and proceed on a first optical path I1, and the B light beam is reflected by the first dichroic filter 109 and proceeds on a second optical path I2. The R and G light beams proceeding on the first optical path I1 are split again by the second dichroic filter 112 such that the R light beam is transmitted by the second dichroic filter 112 and goes straight on the first optical path I1 and the G light beam is reflected by the second dichroic filter 112 and proceeds on a third optical path I3.

The R, G, and B light beams are scrolled by corresponding first through third prisms 114, 135, and 142, respectively. The first through third prisms 114, 135, and 142 are respectively disposed on the first through third optical paths I1 through I3 and rotate at a constant speed so as to scroll R, G, and B color bars. The B and G light beams respectively proceeding the second and third optical paths I2 and I3 are respectively transmitted and reflected by the third dichroic filter 139 and thus mixed. Thereafter, the R, G, and B light beams are mixed by the fourth dichroic filter 122 and then transmitted by a polarized beam splitter 127 so as to form an image due to a light valve 130.

FIG. 2 illustrates a procedure in which the R, G, and B color bars are scrolled by the rotations of the first through third prisms 114, 135, and 142. FIG. 2 shows the movement of color bars formed on a surface of the light valve 130 when the first through third prisms 114, 135, and 142 are rotated in synchronization with one another.

The light valve 130 processes image information according to an on/off signal for each pixel to form an image, and the image is enlarged by a projection lens (not shown) and transferred to a screen.

In the above-described conventional technique, separate optical paths are used for different colors, and therefore, separate optical path compensation lenses are required for the different colors and parts for collecting the split light beams are also required. Since parts for the different colors need to be separately prepared, the volume of an optical system increases. A yield also decreases due to complicated manufacturing and assembling processes. Moreover, driving three motors to rotate the first through third prisms 114, 135, and 142 produces large noise and increases a manufacturing cost compared to a color wheel method using a single motor.

Further, to form a color image using a scrolling method, such color bars as shown in FIG. 2 need to be moved at a constant speed. However, it is difficult to synchronize the light valve 130 and the three prisms 114, 135, and 142 in the above-described structure. Moreover, since the first through third prisms 114, 135, and 142 move in a circle, a scrolling speed is not constant, which may degrade the quality of the image.

SUMMARY OF THE INVENTION

An apparatus consistent with the present invention provides a scrolling unit for scrolling color bars using a single component part.

The present invention also provides a color illuminating system for radiating scrolled light to form a color image with a simple optical structure.

The present invention also provides a projection system which is structured to perform color scrolling using a single component part, thereby having a small size, and which efficiently performs color scrolling, thereby increasing picture quality.

According to a non-limiting, exemplary aspect of the present invention, there is provided a scrolling unit comprising a first spiral lens disk which comprises a plurality of cylindrical lens cells arranged in a spiral pattern, the first spiral lens disk being able to be rotated. A second spiral lens disk is installed facing the first spiral lens disk and can be rotated at the same speed as the first spiral lens disk. A glass rod is installed between the first and second spiral lens disks.

According to another non-limiting aspect of the present invention, there is provided a color illuminating system comprising a light source which radiates light, an optical splitter which splits the light radiated from the light source into light beams having different colors, and a scrolling unit. The scrolling unit comprises a first spiral lens disk which includes a plurality of cylindrical lens cells arranged in a spiral pattern and can be rotated. A second spiral lens disk is installed facing the first spiral lens disk and can be rotated at the same speed as the first spiral lens disk. A glass rod is installed between the first and second spiral lens disks. Here, as the first and second spiral lens disks rotate, paths on which the light beams having different colors proceed are periodically changed, and therefore, the light beams having different colors are scrolled.

According to still another non-limiting aspect of the present invention, there is provided a projection system comprising a light source, an optical splitter, a scrolling unit, a light valve, and a projection lens unit. The light source radiates light. The optical splitter splits the light radiated from the light source into light beams having different colors. The scrolling unit comprises a first spiral lens disk which includes a plurality of cylindrical lens cells arranged in a spiral pattern and can be rotated. A second spiral lens disk is installed facing the first spiral lens disk and can be rotated at the same speed as the first spiral lens disk. A glass rod is installed between the first and second spiral lens disks, wherein as the first and second spiral lens disks rotate, paths on which the light beams having different colors proceed are periodically changed, and therefore, the light beams having different colors are scrolled. The light valve processes the light beams having different colors scrolled by the scrolling unit according to an image signal to form a color image. The projection lens unit enlarges and projects the image formed by the light valve onto a screen.

The optical splitter may comprise first through third dichroic filters arranged side by side and slanting at different angles. Each of the first through third dichroic filters selectively transmits and reflects incident light according to wavelengths.

The optical splitter may also comprise a first dichroic prism, a second dichroic prism, and a third dichroic prism. The first dichroic prism comprises a first dichroic mirror and a first reflecting plane. The first dichroic mirror slants with respect to an axis of incident light, reflects a first color light beam in the incident light, and transmits the other color light beams. The first reflecting plane totally reflects light which is incident at a predetermined angle. The second dichroic prism comprises a second dichroic mirror and a second reflecting plane. The second dichroic mirror slants with respect to the axis of the incident light, reflects a second color light beam in light transmitted by the first dichroic prism, and transmits the other color light beams. The second reflecting plane totally reflects light which is incident at a predetermined angle. The third dichroic prism comprises a third dichroic mirror and a third reflecting plane. The third dichroic mirror slants with respect to the axis of the incident light and reflects a third color light beam in light transmitted by the second dichroic prism. The third reflecting plane totally reflects light which is incident at a predetermined angle.

The optical splitter may further comprise a first polarized beam splitter, a second polarized beam splitter, and a ½ wavelength plate. The first polarized beam splitter is provided on an incident surface of the first dichroic prism. The first polarized beam splitter transmits a first light beam having one polarization in non-polarized white light incident thereon so that the first light beam proceeds to the first dichroic prism, and reflects a second light beam having another polarization. The second polarized beam splitter reflects the second light beam reflected from the first polarized beam splitter so that the second light beam proceeds to the first dichroic prism. The ½ wavelength plate is disposed between the first dichroic prism and one of the first and second polarized beam splitters. The ½ wavelength plate changes a polarization direction so that the first and second light beams have the same polarization direction. Accordingly, the incident light is changed into color light beams having a predetermined polarization.

The projection system may further comprise a first cylindrical lens and a second cylindrical lens. The first cylindrical lens is disposed between the light source and the first spiral lens disk and decreases a width of light on the first spiral lens disk. The second cylindrical lens is disposed behind the second spiral lens disk and parallels light incident from the second spiral lens disk.

The projection system may further comprise a first fly-eye lens array and a second fly-eye lens array which focus the light beams having different colors output from the scrolling unit on the light valve according to the different colors.

BRIEF DESCRIPTION OF THE DRAWINGS

The above and other features and advantages of the present invention will become more apparent by describing in detail illustrative, non-limiting embodiments thereof with reference to the attached drawings in which.

DETAILED DESCRIPTION OF ILLUSTRATIVE, NON-LIMITING EMBODIMENTS OF THE INVENTION

Figure 1:
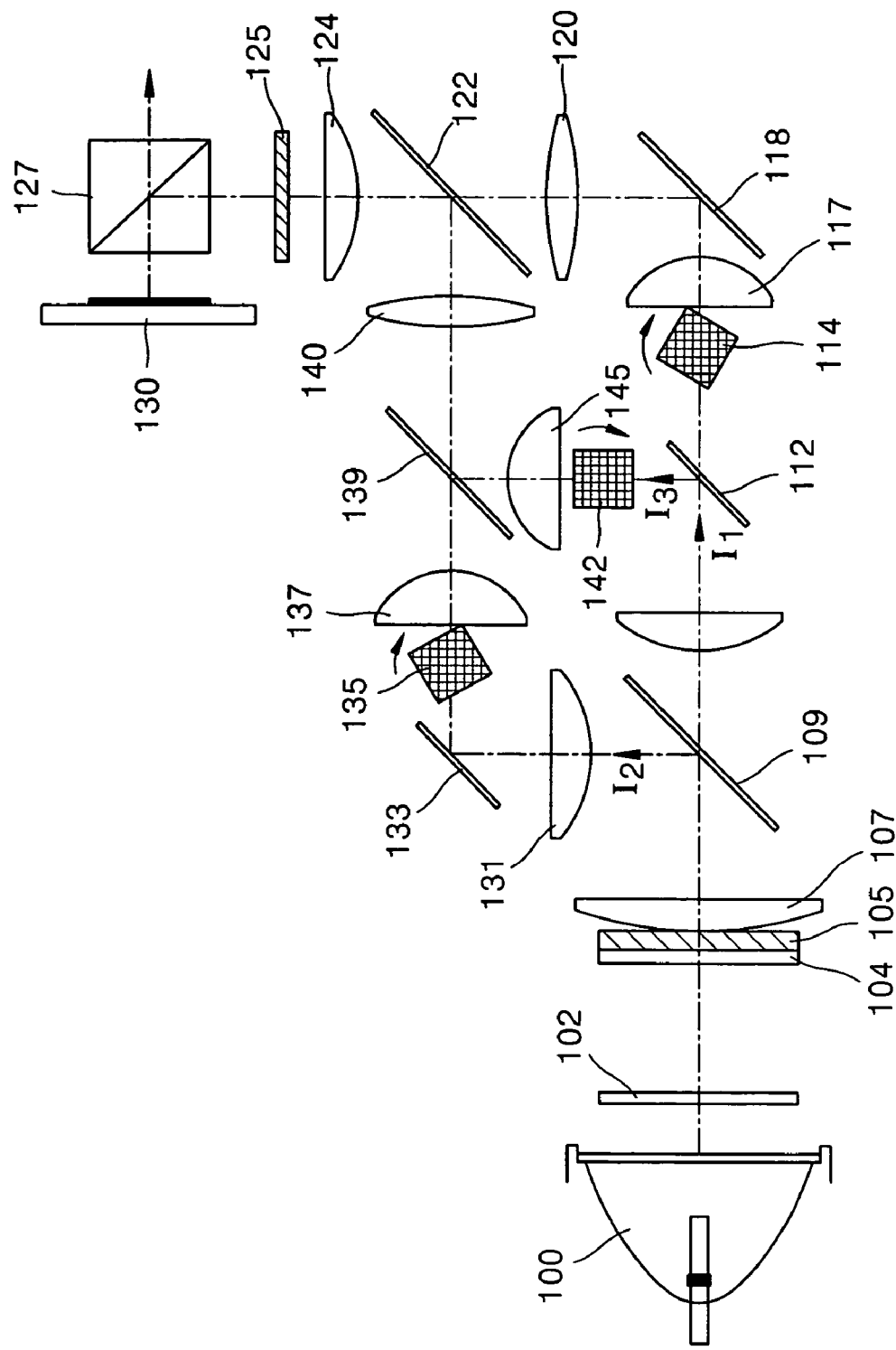
FIG. 1 is a diagram of a conventional projection system.
Figure 2:
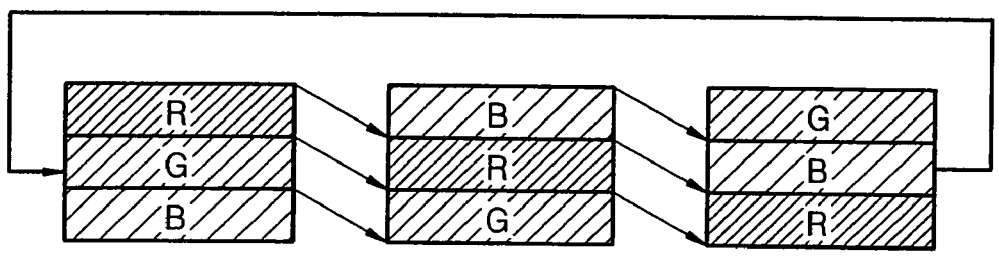
FIG. 2 is a diagram illustrating a color scrolling operation of a projection system.
Figure 3:
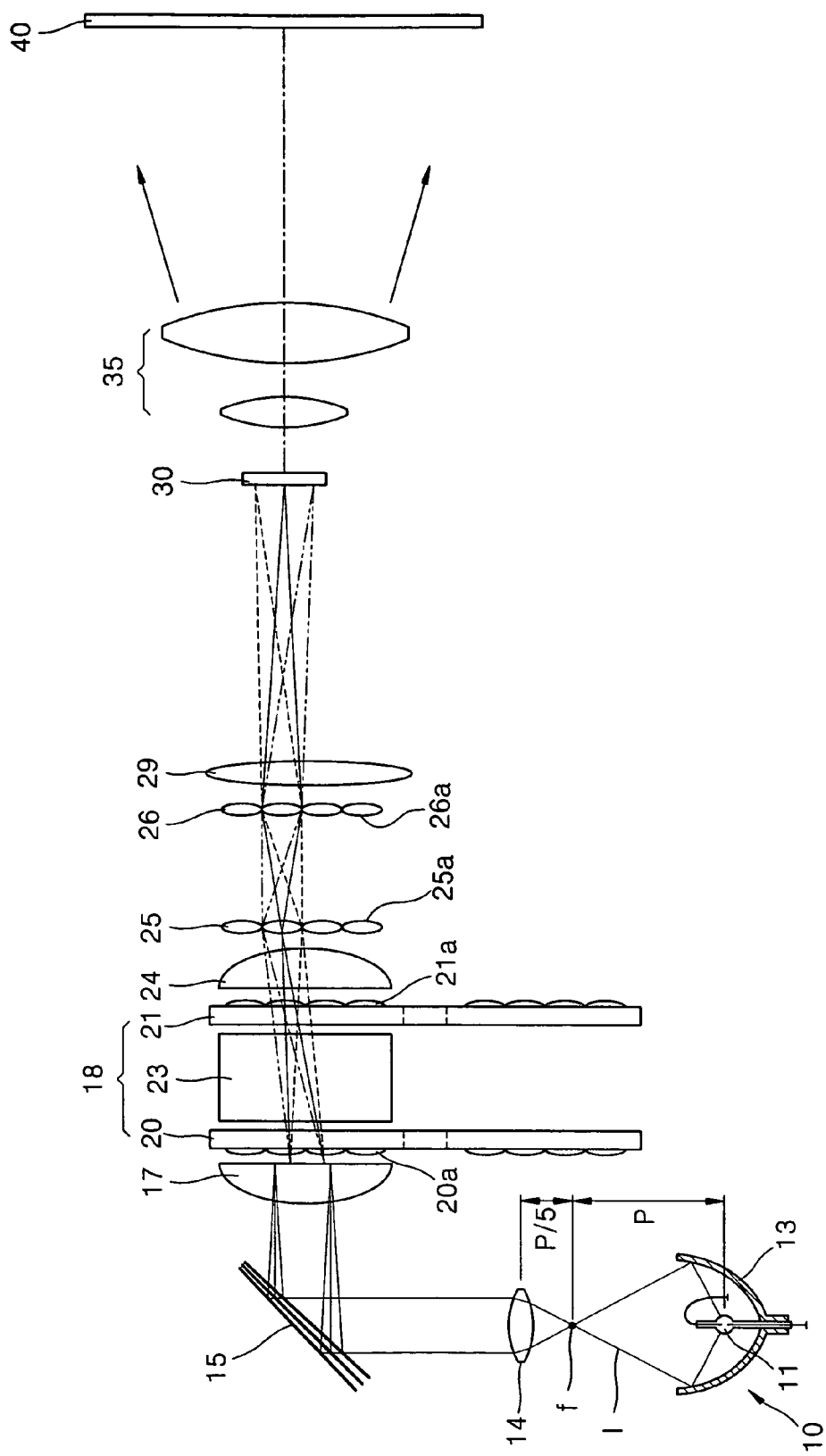
FIG. 3 is a schematic diagram of a projection system according to a first exemplary embodiment of the present invention.

Referring to FIG. 3, a color illuminating system according to a first embodiment of the present invention includes a light source 10, an optical splitter 15 which splits light radiated from the light source 10 into different wavelengths, and a scrolling unit 18 which scrolls three red (R), green (G), and blue (B) light beams split by the optical splitter 15. A projection system according to the first embodiment of the present invention includes the light source 10, the optical splitter 15 which splits light radiated from the light source 10 into different wavelengths, the scrolling unit 18 which scrolls three R, G, and B light beams split by the optical splitter 15, and a light valve 30 which processes the beams scrolled by the scrolling unit 18 according to an image signal to form a color image.

The light source 10 radiates white light and includes a lamp 11 which generates light and a reflecting mirror 13 which reflects the light emitted from the lamp 11 to guide the light to a predetermined path. The reflecting mirror 13 may be implemented by an elliptical reflector which has a location of the lamp 11 as one focus and a point at which light is collected as the other focus. Alternatively, the reflecting mirror 13 may be implemented by a parabolic reflector which has the location of the lamp 11 as a focus and reflects light emitted from the lamp 11 to be parallel. In FIG. 3, the elliptical reflector is used as the reflecting mirror 13. When the parabolic reflector is used as the reflecting mirror 13, a lens for focusing light is further required.

A collimating lens 14 is provided on an optical path between the light source 10 and the optical splitter 15 and collimates incident light. When a distance between the light source 10 and a focus "f" at which light radiated from the light source 10 is collected is represented by P, it is preferable, but not necessary, that the collimating lens 14 is disposed at a position separated from the focus "f" by P/5. Such a disposition of the collimating lens 14 can reduce etendue which refers to a conserved physical quantity measuring the dimensions of a light beam. When the etendue is reduced, an optical system can be miniaturized and easily configured.

Figure 4:
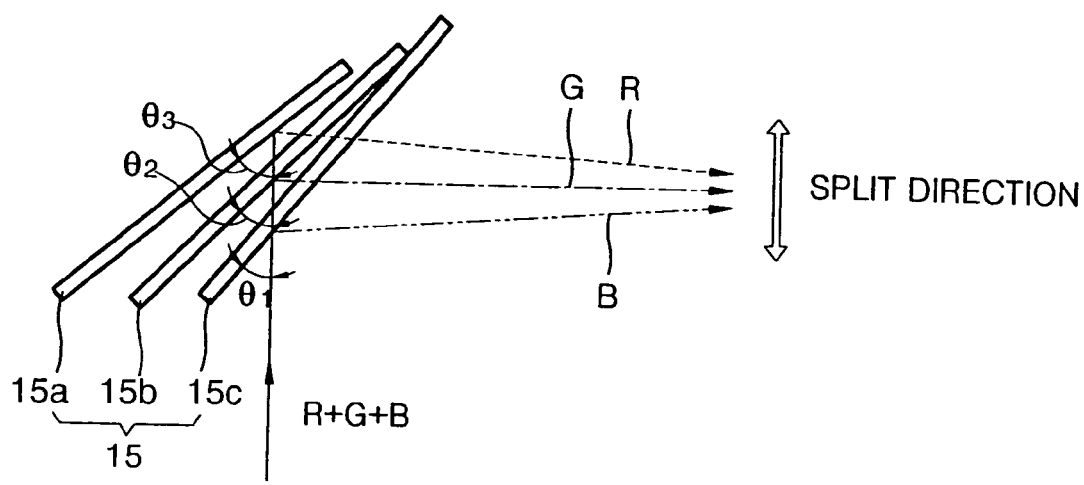
FIG. 4 is a diagram illustrating a beam splitting operation of an optical splitter used by a projection system according to the present invention.

As shown in FIG. 4, the optical splitter 15 may include first, second, and third dichroic filters 15a, 15b, and 15c which slant at different angles $\theta_1$, $\theta_2$, and $\theta_3$ (where $\theta_1 > \theta_2 > \theta_3$) with respect to an optical axis of incident light.

Figure 5A:
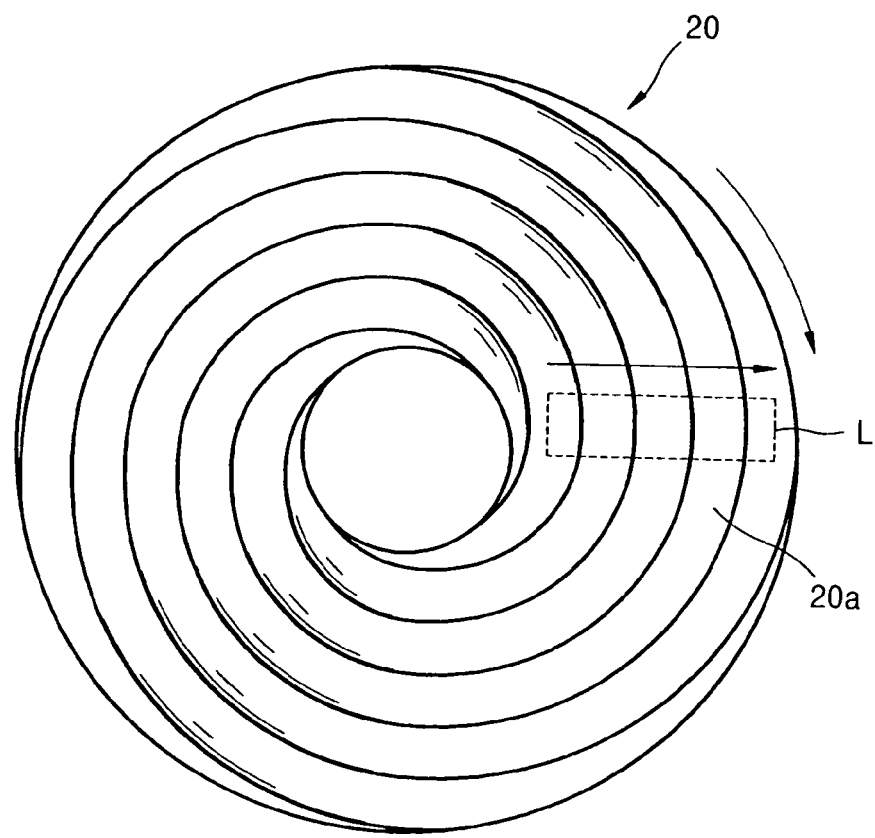
FIG. 5A is a front view of a spiral lens disk used by a scrolling unit according to the present invention.
Figure 5B:
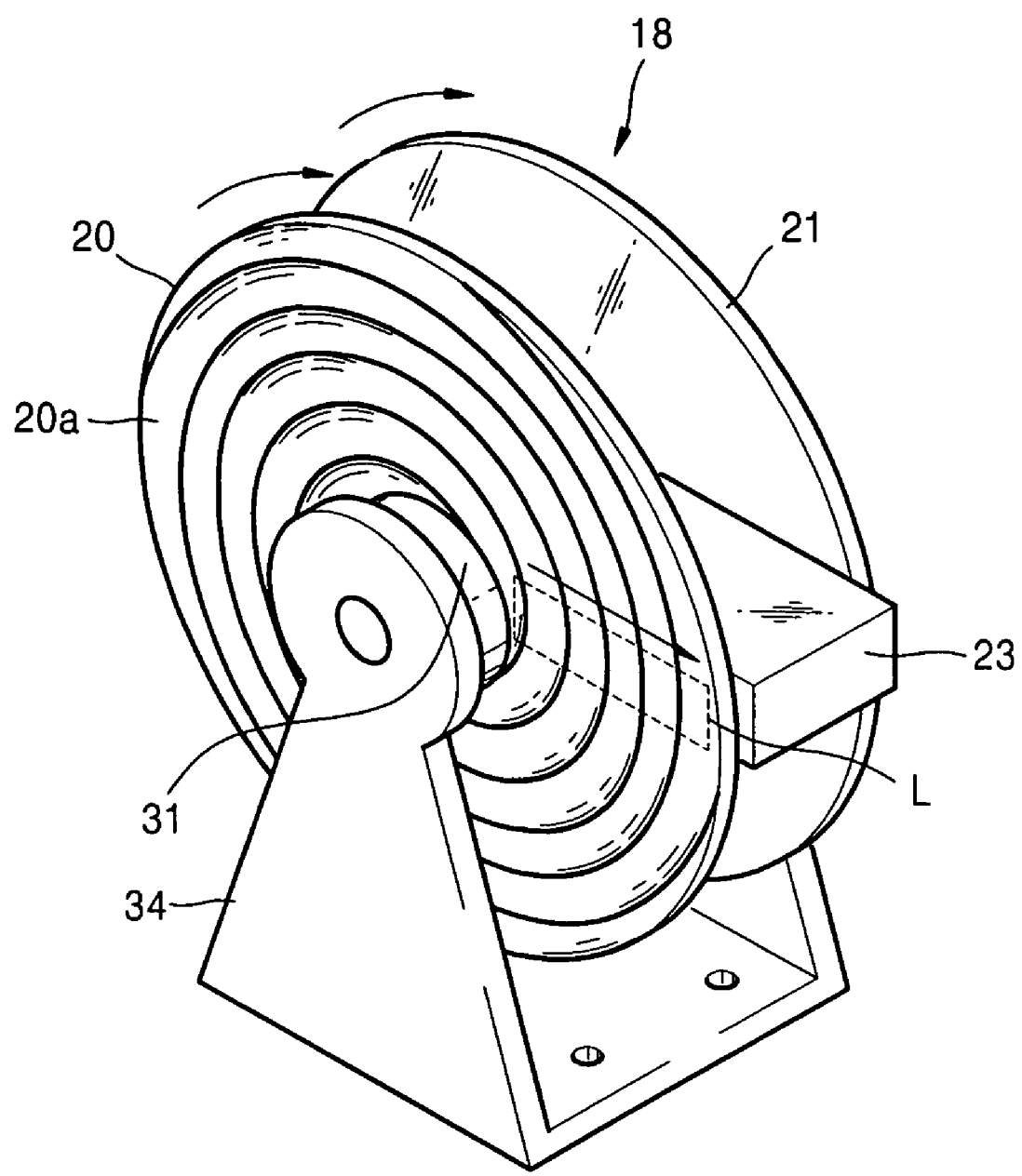
FIG. 5B is a perspective view of a scrolling unit according to the present invention.

Referring to FIGS. 5A and 5B, the scrolling unit 18 includes first and second spiral lens disks 20 and 21 separated from each other by a predetermined distance and a glass rod 23 disposed between the first and second spiral lens disks 20 and 21. Cylindrical lens cells 20a are arranged in a spiral pattern on at least one side of the first spiral lens disk 20. Similarly, cylindrical lens cells 21a are arranged in a spiral pattern on at least one side of the second spiral lens disk 21. A cross-section of each of the spiral lens disks 20 and 21 has a structure of a cylindrical lens array. The first and second spiral lens disks 20 and 21 are supported by a bracket 34 such that they are rotated at the same speed by a driving source 31.

A first cylindrical lens 17 is disposed before the first spiral lens disk 20, and a second cylindrical lens 24 is disposed behind the second spiral lens disk 21. The first and second cylindrical lenses 17 and 24 may be replaced with first and second diffractive optical elements which have a predetermined diffraction pattern for focusing only light incident in a particular direction.

First and second fly-eye lens arrays 25 and 26 and a relay lens 29 may be further provided on an optical path between the second spiral lens disk 21 and the light valve 30. A plurality of convex portions 25a are arranged in two dimensions on at least one of the incident and output surfaces of the first fly-eye lens array 25. Similarly, a plurality of convex portions 26a are arranged in two dimensions on at least one of the incident and output surfaces of the second fly-eye lens array 26. A color image formed by the light valve 30 is enlarged and projected onto a screen 40 by a projection lens unit 35.

The following description concerns an operation of a projection system having the above-described structure. White light radiated from the light source 10 is split into three R, G, and B light beams by the optical splitter 15. The optical splitter 15 splits incident light into predetermined different wavelengths and outputs split light beams at different angles. For example, the first dichroic filter 15a receives white light, reflects the R light beam in the red wavelength range, and transmits the G and B light beams in the other wavelength ranges. The second dichroic filter 15b receives the light transmitted by the first dichroic filter 15a, reflects the G light beam in the green wavelength range, and transmits the B light beam in the blue wavelength range. The third dichroic filter 15c reflects the B light beam in the blue wavelength range which has been transmitted by the first and second dichroic filters 15a and 15b.

The R, G, and B light beams split into different wavelengths by the first through third dichroic filters 15a through 15c are reflected at different angles. For example, the R and B light beams slant toward the G light beam so that the R, G, and B light beams are focused on the first spiral lens disk 20. Each of the split color light beams is incident onto the glass rod 23 via the first spiral lens disk 20.

Light having passed through the glass rod 23 is incident onto the second spiral lens disk 21. The glass rod 23 and the second spiral lens disk 21 prevent light from diverging due to the first spiral lens disk 20.

Figure 6A:
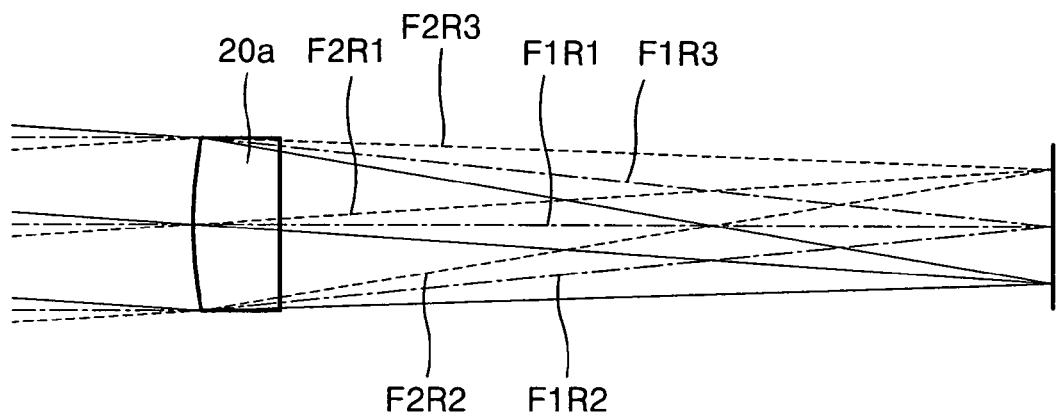
FIGS. 6A and 6B respectively show the result of simulating beam divergence angles when a projection system of the present invention does not include a second spiral lens disk and the result of simulating beam divergence angles when the projection system of the present invention includes the second spiral lens disk.
Figure 6B:
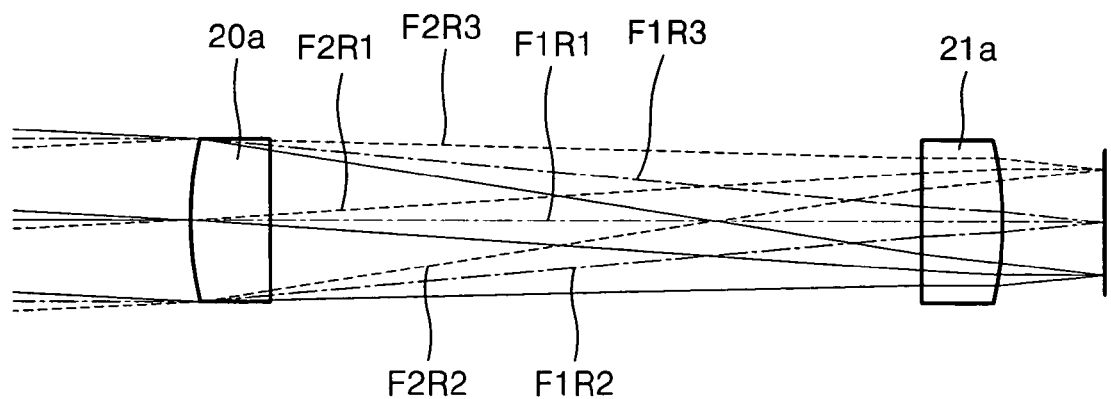

FIGS. 6A and 6B show the results of a simulation performed to examine the effect of the second spiral lens disk 21 preventing divergence of light. FIG. 6A shows the result of simulating divergence angles of light beams having passed through the first spiral lens disk 20 in a first case where the second spiral lens disk 21 does not exist. FIG. 6B shows the result of simulating divergence angles of light beams having passed through the first spiral lens disk 20 in a second case where the second spiral lens disk 21 exists. In FIGS. 6A and 6B, only single lens cells 20a and 21a of the respective first and second spiral lens disks 20 and 21 are illustrated.

The lens cells 20a and 21a have a numerical aperture (NA) of 0.104. Table 1 shows divergence angles of light beams of the different wavelengths on an image plane.

TABLE 1

|  | First case (E) | Second case (E) |
| --- | --- | --- |
| F1R1 | 0 | 0 |
| F1R2 | 6.08241185604 | 6.02953862536 |
| F1R3 | 6.08241185604 | 6.02953862536 |
| F2R1 | 4.0 | 0.589576931389 |
| F2R2 | 10.0290329291 | 6.54223989609 |
| F2R3 | 2.18773761515 | 5.5440169460 |

In Table 1, F1 denotes a light beam traveling at the center among light beams which have different wavelengths and travel on different optical paths. F2 denotes one of light beams traveling at both sides of the central light beam F1. Since light beams traveling at both sides of the central light beam F2 are symmetric, only one of the side light beams is described. R1, R2, and R3 respectively denote different paths on which light beams having the same wavelength travel. Referring to Table 1 showing the result of simulation, divergence angles decrease in the second case where the second spiral lens disk 21 exists compared to the first case where the second spiral lens disk 21 does not exist.

When the glass rod 23 is disposed between the first and second spiral lens disks 20 and 21, the glass rod 23 enables light having passed through the first spiral lens disk 20 to be incident onto the second spiral lens disk 21 without diverging and also serves as a waveguide by outputting incident light as it is.

Figure 7A:
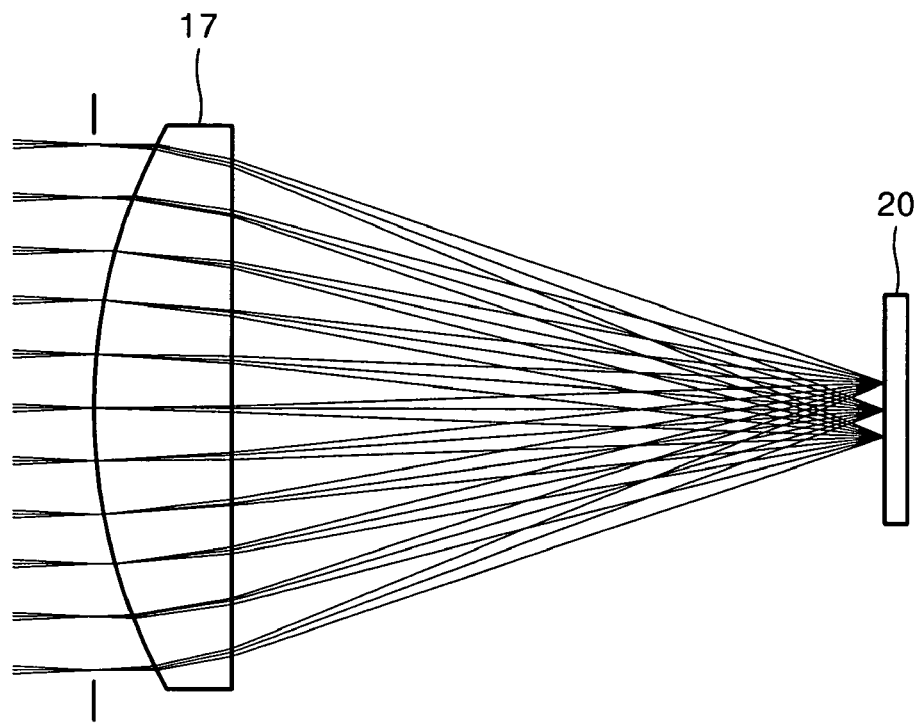
FIGS. 7A through 7C illustrate effects of a glass rod used by a projection system according to the present invention.
Figure 7B:
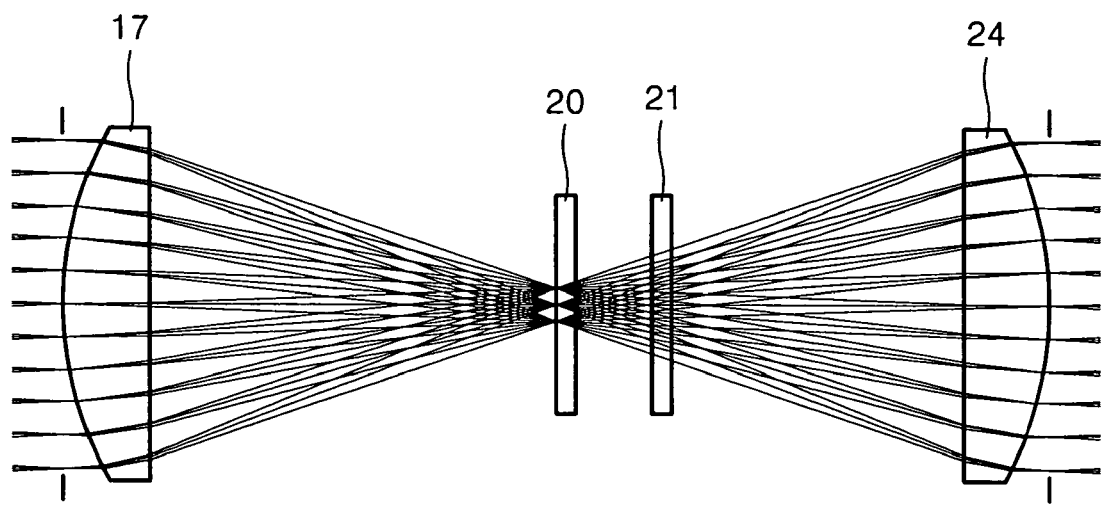

FIG. 7A illustrates a case where light having passed through the first cylindrical lens 17, which has a field of ±2E, is incident onto the first spiral lens disk 20. The light on the first spiral lens disk 20 has a size of 8 mm. FIG. 7B shows paths of light which passes through the first cylindrical lens 17, the first and second spiral lens disks 20 and 21, and the second cylindrical lens 24 when the glass rod 23 is not used. Incident light on the first spiral lens disk 20 has a size of about 8 mm, and incident light on the second spiral lens disk 20 has a size of about 26 mm.

Figure 7C:
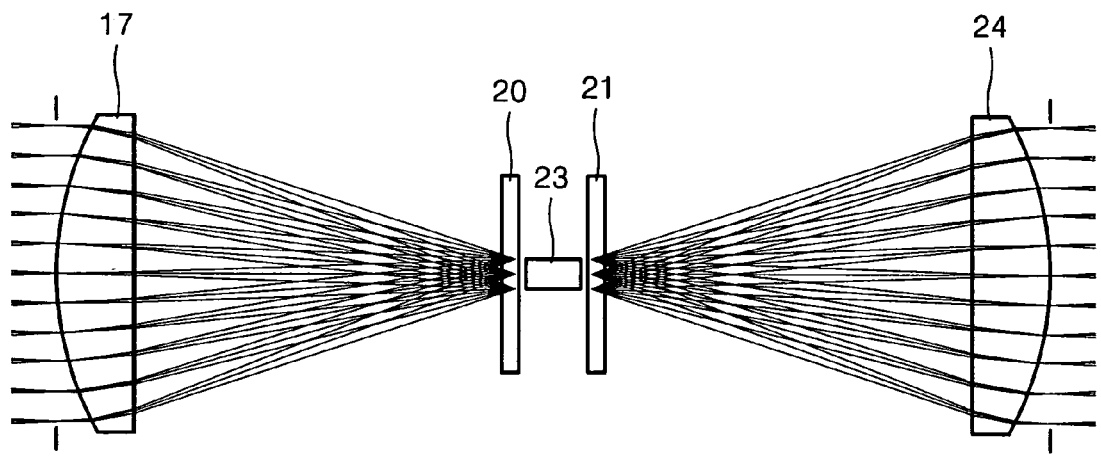

When the size of incident light on the first spiral lens disk 20 is different from that on the second spiral lens disk 21, a divergence angle of light incident onto the second cylindrical lens 24 is large. Accordingly, as shown in FIG. 7C, the glass rod 23 is installed between the first and second spiral lens disks 20 and 21 so that the size of incident light on the first spiral lens disk 20 is the same as that on the second spiral lens disk 21. The glass rod 23 may have a length of 20 mm. Loss of light can be reduced by decreasing beam divergence angles using the glass rod 23.

The following description concerns a scrolling operation of the scrolling unit 18 having the above-described structure.

Figure 8:
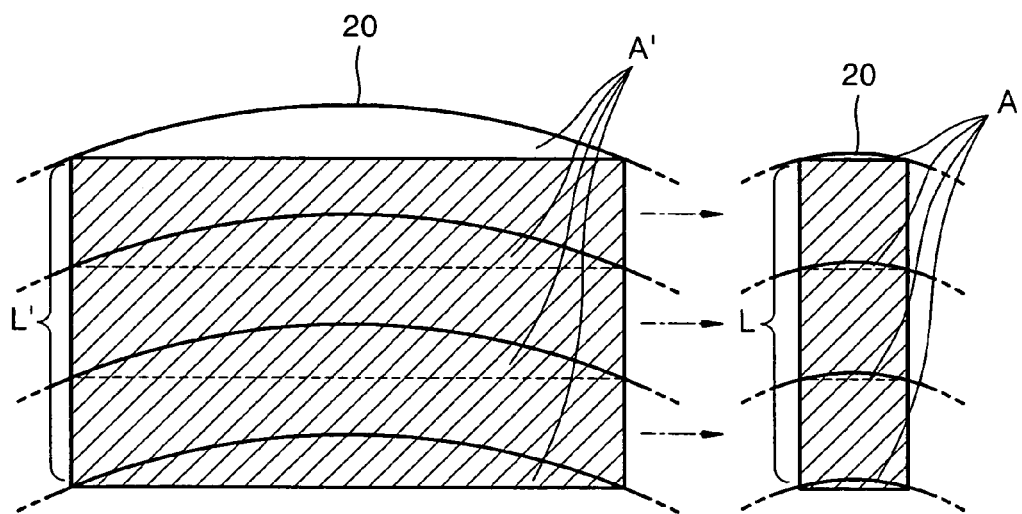
FIG. 8 illustrates an effect of a first cylindrical lens used by a projection system according to the present invention.

Light I radiated from the light source 10 is collimated by the collimating lens 14. Next, the first through third dichroic filters 15a through 15c split the collimated light into different wavelengths and outputs the split light beams at different angles. The light beams are incident onto the first cylindrical lens 17, which decreases the width of incident light. The light whose width has been decreased by the first cylindrical lens 17 is incident onto the first spiral lens disk 20. The light passing through the first spiral lens disk 20 is denoted by a reference character L in FIGS. 5A and 5B. FIG. 8 is a diagram for comparing a case where the light radiated from the light source 10 is incident onto the first spiral lens disk 20 without passing through the first cylindrical lens 17 with a case where the light radiated from the light source 10 is incident onto the first spiral lens disk 20 after being decreased in width by the first cylindrical lens 17.

When the width of light passing through the first spiral lens disk 20 is large, the shape of a spiral lens array greatly disagree with the shape of light LN, and therefore, the light LN corresponding to areas AN of different colors displaced from each spiral lens is lost. Accordingly, it is preferable, but not necessary, to reduce the width of light using the first cylindrical lens 17 so that the shape of the spiral lens array agrees with the shape of light L in order to minimize light loss. When an area of each color of the light L displaced from a spiral lens is referred to as A, A<AN. Consequently, when the width of light incident onto the first spiral lens disk 20 is reduced, light loss is also decreased.

Thereafter, the light having passed through the first spiral lens disk 20 is incident onto the second cylindrical lens 24 via the glass rod 23 and the second spiral lens disk 21. It has been described above that a divergence angle of light is decreased when the light has sequentially passed through the first spiral lens disk 20, the glass rod 23, and the second spiral lens disk 21, and therefore, a detailed description thereof is omitted here.

It is preferable, but not necessary, to dispose the glass rod 23 on a path which the light L whose width has been reduced by the first cylindrical lens 17 travels along.

In the meantime, when the first and second spiral lens disks 20 and 21 rotate at the same speed, color scrolling is accomplished. The glass rod 23 is fixed between the first and second spiral lens disks 20 and 21.

When R, G, and B light beams (i.e., the light L) pass through the first spiral lens disk 20, an effect as if the first spiral lens disk 20 continuously moves up or down at a constant speed can be obtained with respect to the light L. Accordingly, an effect as if a position of a beam passing through the first spiral lens disk 20 continuously changes can be obtained. This effect is illustrated in FIGS. 9A through 9C.

Figure 9A:
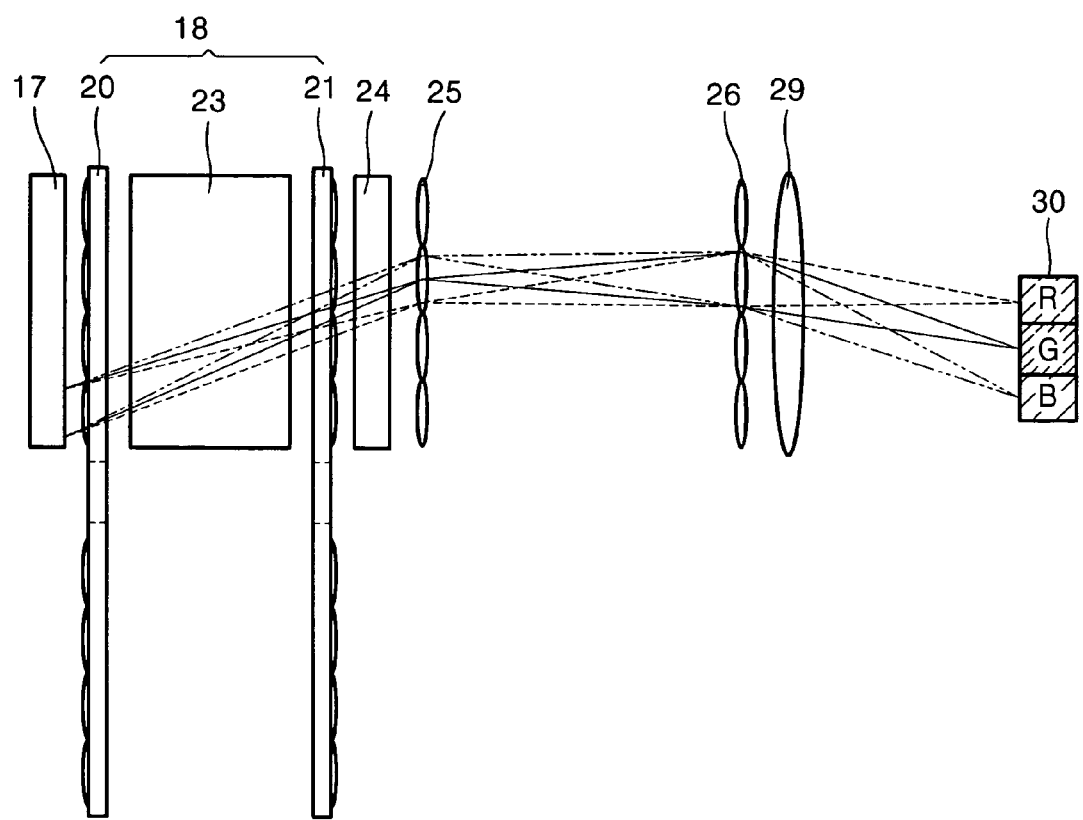
FIGS. 9A through 9C illustrate a scrolling procedure of a projection system according to the present invention.
Figure 9B:
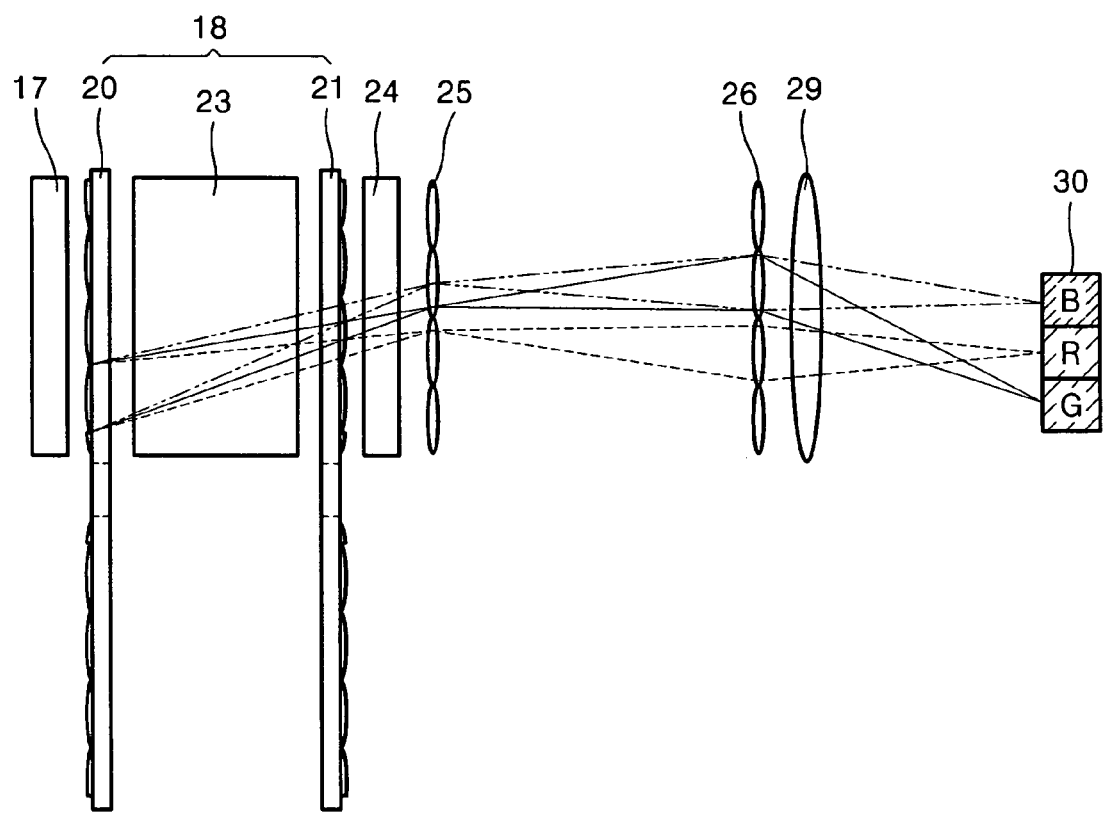
Figure 9C:
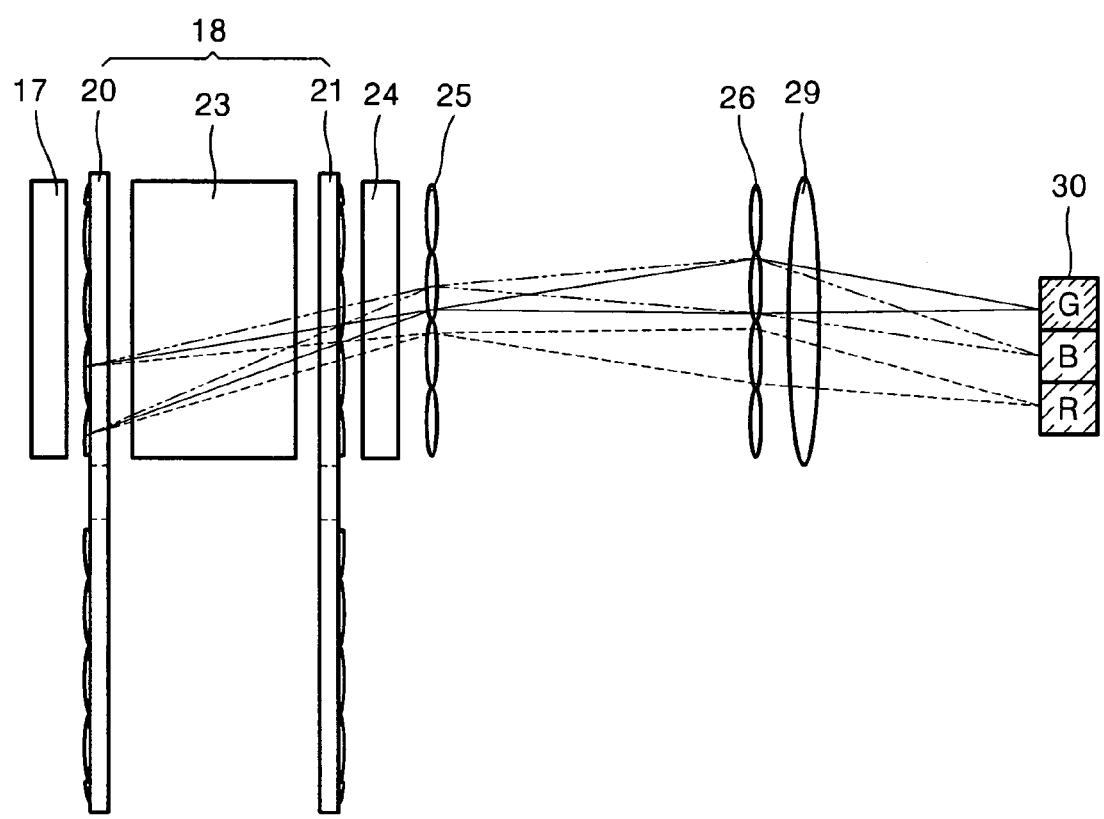

As shown in FIG. 9A, light passes through the first spiral lens disk 20, the glass rod 23, the second spiral lens disk 21, the second cylindrical lens 24, the first and second fly-eye lens arrays 25 and 26, and the relay lens 29 and forms color bars in order of R, G, and B on the light valve 30. Thereafter, as the first and second spiral lens disks 20 and 21 rotate, portions of the respective first and second spiral lens disks 20 and 21 through which the light has passed moves upward. As the first and second spiral lens disks 20 and 21 move, color bars are formed in order of B, R, and G, as shown in FIG. 9B, and continuously, formed in order of G, B, and R, as shown in FIG. 9C.

The above-described scrolling operation is repeated as the first and second spiral lens disks 20 and 21 rotate. In other words, the rotary motion of the first and second spiral lens disks 20 and 21 leads a change in portions of the respective first and second spiral lens disks 20 and 21 onto which a beam is incident and is converted into a rectilinear motion on a cross-section of the first and second spiral lens disks 20 and 21, so that scrolling can be accomplished.

Here, continuity and consistency can be achieved because scrolling is accomplished by continuously rotating the first and second spiral lens disks 20 and 21 in one direction without changing the direction of rotation. In addition, since scrolling is accomplished using a single component part, i.e., the scrolling unit 18, the changing speed of color bars can be advantageously maintained constant. Moreover, since a beam divergence angle is reduced using the first and second spiral lens disks 20 and 21 and the glass rod 23, light loss can be decreased.

Since a beam has a narrow width due to the operation of the first cylindrical lens 17 while passing through the first and second spiral lens disks 20 and 21, an effect as if the beam passes through a cylindrical lens array performing a rectilinear motion can be accomplished. After passing through the second spiral lens disk 21, the beam is restored to the original width and paralleled by the second cylindrical lens 24.

Next, the light having passed through the second cylindrical lens 24 is transferred onto the light valve 30 by colors by the first and second fly-eye lens arrays 25 and 26. For example, when the light valve 30 is divided into three sections, R, G, and B light beams are transferred onto upper, middle, and lower sections, respectively, of the light valve 30, forming color bars. When the first and second fly-eye lens arrays 25 and 26 do not exist, R, G, and B light beams are scrolled on each pixel of the light valve 30. When a scrolling operation is performed on each pixel, it may be difficult to control, the probability of occurrence of errors may be high, and picture quality may be degraded. However, in the present invention, since color bars are formed by transferring R, G, and B light beams onto the three sections of the light valve 30 using the first and second fly-eye lens arrays 25 and 26 and scrolled, it is easy to control the scrolling operation.

The first and second fly-eye lens arrays 25 and 26 also uniformize the strength of light radiated onto the light valve 30.

The relay lens 29 transfers the light having passed through the first and second fly-eye lens arrays 25 and 26 to a predetermined location, for example, the light valve 30.

The numbers of lens cells 20a and 21a of the first and second spiral lens disks 20 and 21 can be adjusted in order to synchronize an operating frequency of the light valve 30 with the rotary frequency of the first and second spiral lens disks 20 and 21. In other words, when the operating frequency of the light valve 30 increases, more lens cells 20a and 21a are provided so that a scrolling speed is increased while the rotary speed of the first and second spiral lens disks 20 and 21 is maintained constant.

Alternatively, the first and second spiral lens disks 20 and 21 can be synchronized with the light valve 30 by adjusting the rotary frequency of the first and second spiral lens disks 20 and 21 while the numbers of lens cells 20a and 21a are maintained constant. For example, when the light valve 30 has an operating frequency of 960 Hz, i.e., when the light valve 30 operates at a speed of $1/960$ second per frame and reproduces 960 frames per second, each of the first and second spiral lens disks 20 and 21 can be configured such that it has a maximum diameter of 140 mm, a minimum diameter of 60 mm, and 32 lens cells 20a or 21a each of which has a width of 5.0 mm and a radius of curvature of 24.9 mm. When the first and second spiral lens disks 20 and 21 reproduces 32 frames per one rotation, they are rotated 30 times per second to reproduce 960 frames per second. In this situation, the first and second spiral lens disks 20 and 21 are rotated 1800 times per 60 seconds, i.e., at a speed of 1800 rpm. When the operating frequency of the light valve 30 increases by 0.5 and the light valve 30 operates at a frequency of 1440 Hz, the first and second spiral lens disks 20 and 21 are rotated at a speed of 2700 rpm to be synchronized with the light valve 30.

In the present invention, light efficiency of a single-panel projection system can be maximized by using the scrolling unit 18.

The following description concerns an illuminating system and a projection system according to a second exemplary embodiment of the present invention.

Figure 10:
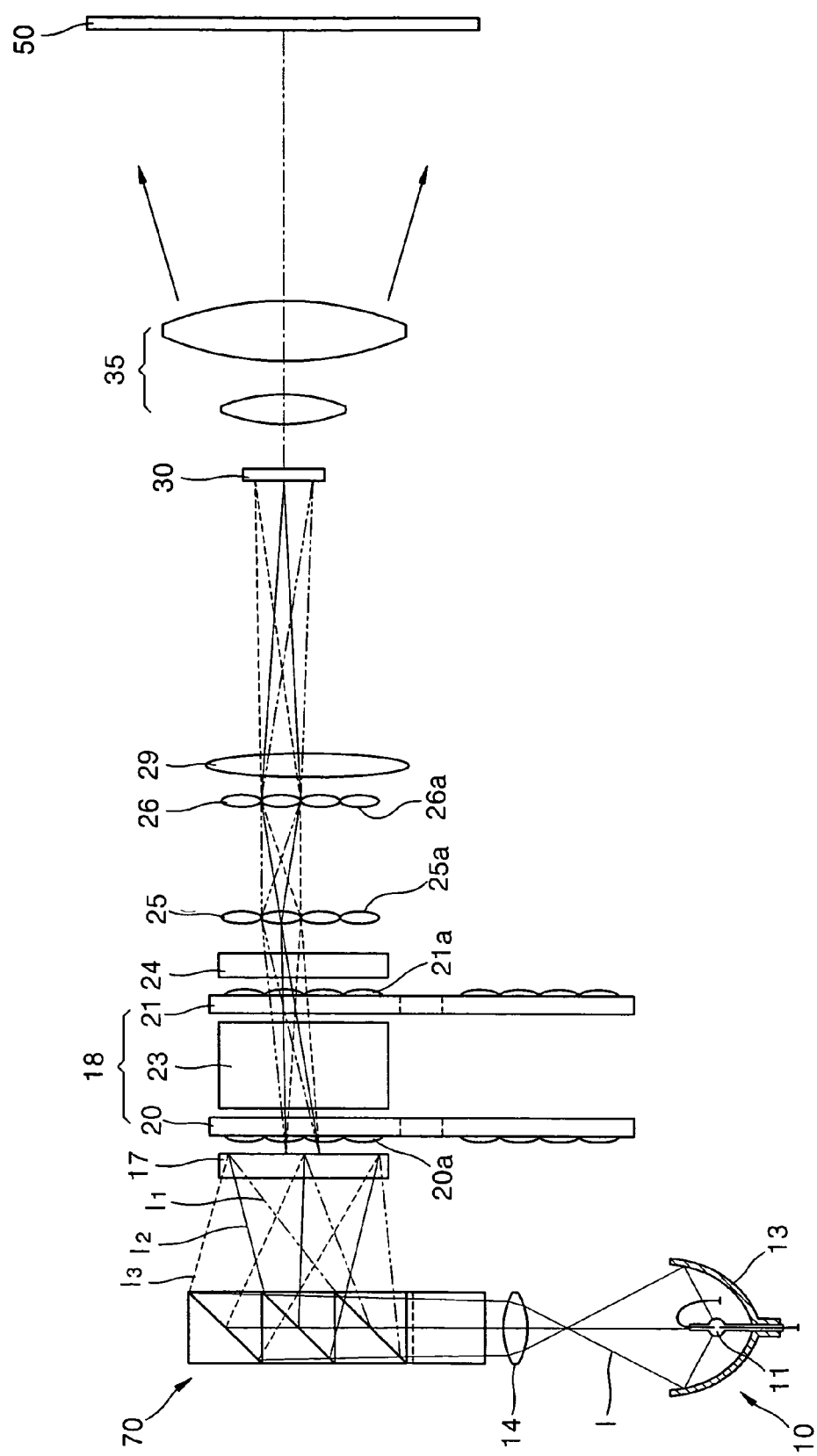
FIG. 10 is a diagram of a projection system according to a second exemplary embodiment of the present invention.

As shown in FIG. 10, the projection system according to the second embodiment of the present invention includes a light source 10, an optical pipe 70 which splits light radiated from the light source 10 into predetermined different wavelengths, the scrolling unit 18 which scrolls three R, G, and B light beams split by the optical pipe 15, and a light valve 30 which processes the beams scrolled by the scrolling unit 18 according to an image signal to form a color image.

The projection system according to the second embodiment of the present invention uses the optical pipe 70 instead of the optical splitter 15 including the first through third dichroic filters 15a through 15c used in the projection system according to the first embodiment of the present invention. In FIGS. 3 and 10, the same reference numerals denote the same members having the functions, and therefore, a detailed description thereof will be omitted.

The optical pipe 70 splits incident light into the predetermined different wavelengths and then outputs the split light beams at different angles. The optical pipe 70 also prevents light that is incident at a predetermined angle from being output in a direction other than a desired direction so that light efficiency can be increased.

Figure 11:
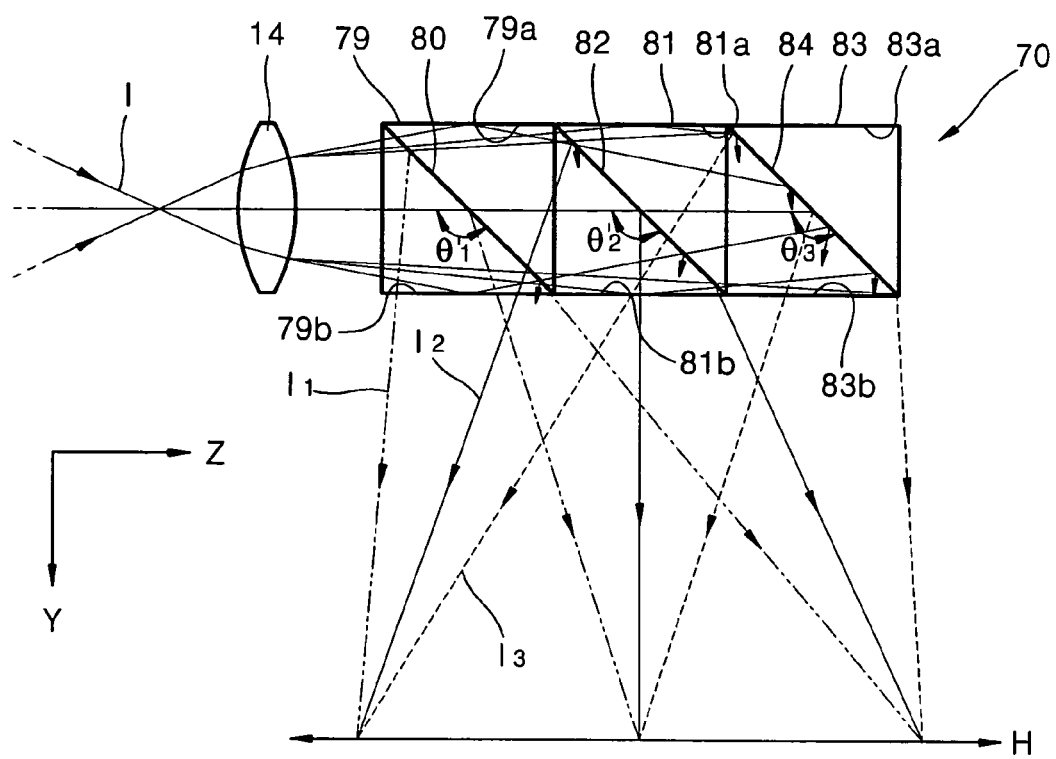
FIG. 11 illustrates an example of an optical pipe used by the projection system according to the second embodiment of the present invention.

To perform the above-described function, as shown in FIG. 11, the optical pipe 70 includes first through three dichroic prisms 79, 81, and 83 each of which reflects light having a particular wavelength and transmits light having the other wavelengths so as to split incident light I into first through third color light beams $I_1$, $I_2$, and $I_3$. Here, a reference character H denotes an image surface.

The first dichroic prism 79 includes a first dichroic mirror 80 slanting at an angle of $\theta N_1$, with respect to an axis of the incident light I. The first dichroic mirror 80 reflects the first color light beam $I_1$, and transmits the second and third color light beam $I_2$ and $I_3$. For example, the first dichroic mirror 80 reflects an R light beam and transmits G and B light beams.

The second dichroic prism 81 is attached to the first dichroic prism 79 and includes a second dichroic mirror 82 slanting at an angle of $\theta N_2$ with respect to the axis of the incident light I. The second dichroic prism 81 reflects the second color light beam $I_2$, for example, the G light beam, and transmits the other color light beams.

The third dichroic prism 83 is attached to the second dichroic prism 81 and includes a third dichroic mirror 84 slanting at an angle of $\theta N_3$ with respect to the axis of the incident light I. The third dichroic prism 83 reflects the third color light beam $I_3$, for example, the B light beam, and transmits the other color light beams. The third dichroic mirror 84 may be replaced with a total reflection mirror which reflects all of the incident light I.

The first dichroic prism 79 includes first reflecting planes 79a and 79b on its walls to totally reflect light incident onto the first reflecting planes 79a and 79b at a predetermined angle to the inside of the first dichroic prism 79. More specifically, the first and second reflecting planes 79a and 79b totally reflect light which is incident thereon at an angle greater than a predetermined angle, i.e., a threshold angle, due to a difference between refractivity of the first dichroic prism 79 and refractivity of an outer atmosphere. The first and second reflecting planes 79a and 79b are provided to prepare for a case where light radiated from the light source 10 is not completely paralleled by the collimating lens 14 and diverges. In other words, when the light I is divergently incident into the first dichroic prism 79, light passing through the walls of the first dichroic prism 79 and going outside can be reduced using the first and second reflecting planes 79a and 79b, and therefore, use efficiency of the incident light I can be increased.

In addition, the second dichroic prism 81 includes second reflecting planes 81a and 81b on its walls, and the third dichroic prism 83 includes third reflecting planes 83a and 83b on its walls. The second and third reflecting planes 81a, 81b, 83a, and 83b perform the same function as the first reflecting planes 79a and 79b, and thus, a detailed description thereof will be omitted.

As described above, since light efficiency is increased using the first through third reflecting planes 79a, 79b, 81a, 81b, 83a, and 83b, an influence of a change in a value of etendue referring to a conserved physical quantity measuring the dimensions of a light beam of an optical system can be reduced.

It is preferable, but not necessary, that the angles $\theta N_1$, $\theta N_2$, and $\theta N_3$ satisfy Formula (1) so that the first through third color light beams $I_1$, $I_2$, and $I_3$ respectively reflected from the first through third dichroic mirrors 80, 82, and 84 are converged on the first cylindrical lens 17.

$$\theta'_1 \sim > = \sim \theta'_2 \sim > = \sim \theta'_3 \qquad (1)$$

The optical pipe 70 is suitable for a projection system using, for example, a micromirror device (not shown), which can form an image regardless of the polarization characteristic of incident light, as the light valve 30.

Figure 12:
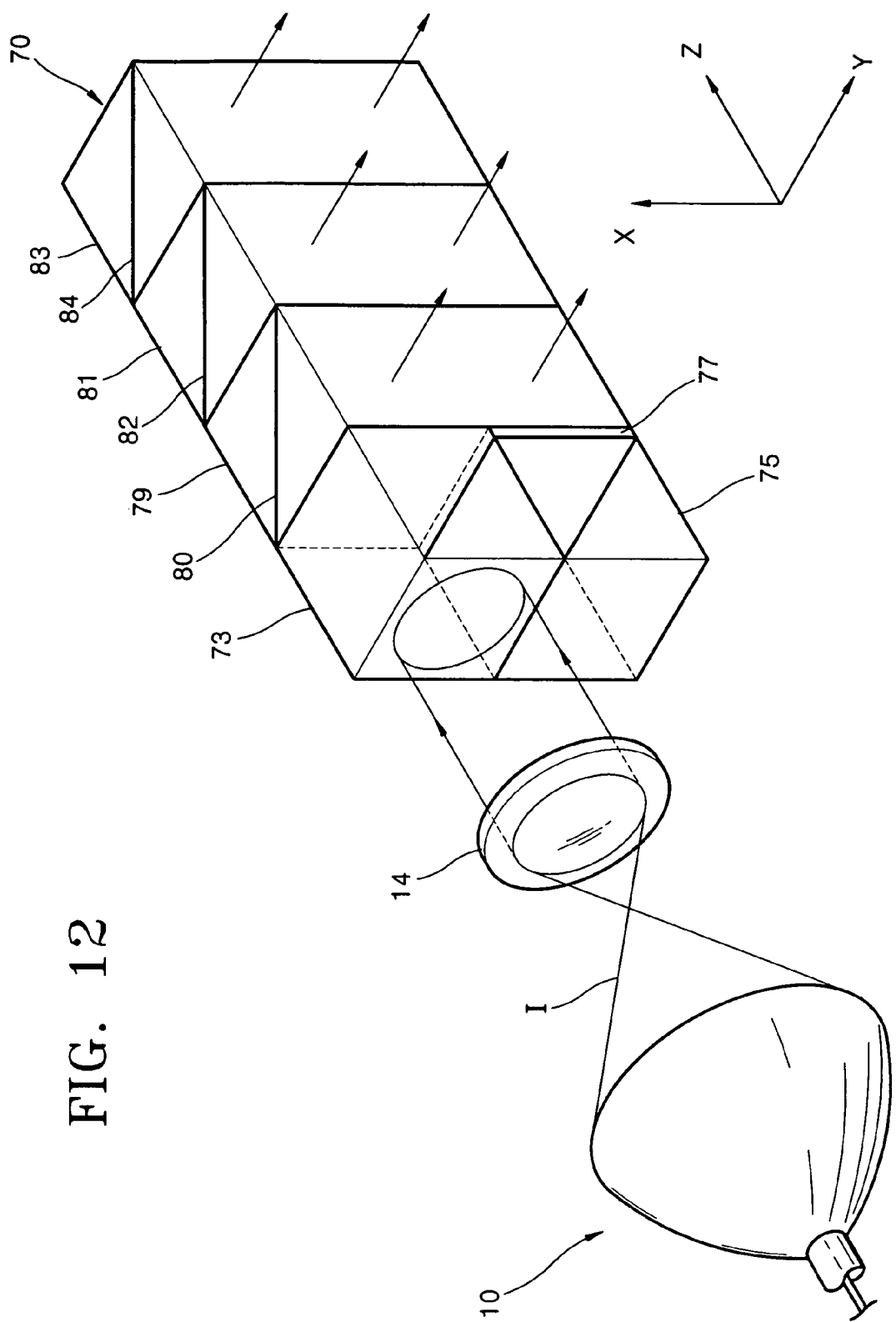
FIG. 12 illustrates another example of an optical pipe used by the projection system according to the second embodiment of the present invention.
Figure 13:
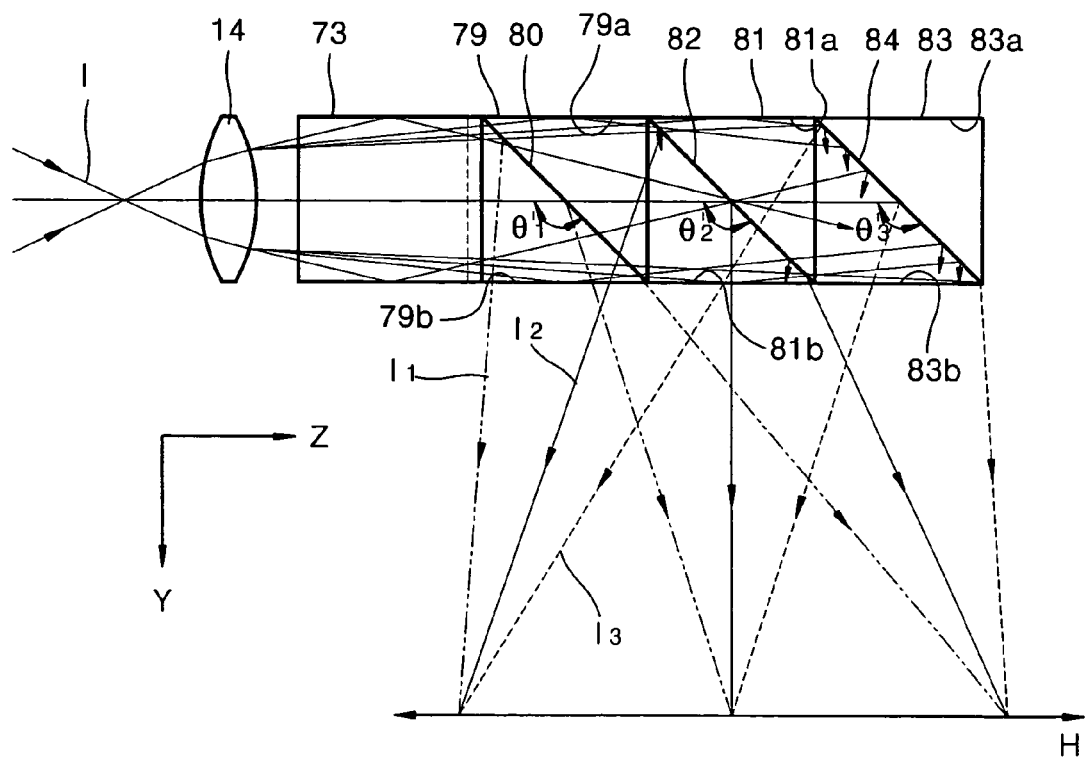
FIG. 13 is a plane view of the optical pipe shown in FIG. 12.
Figure 14:
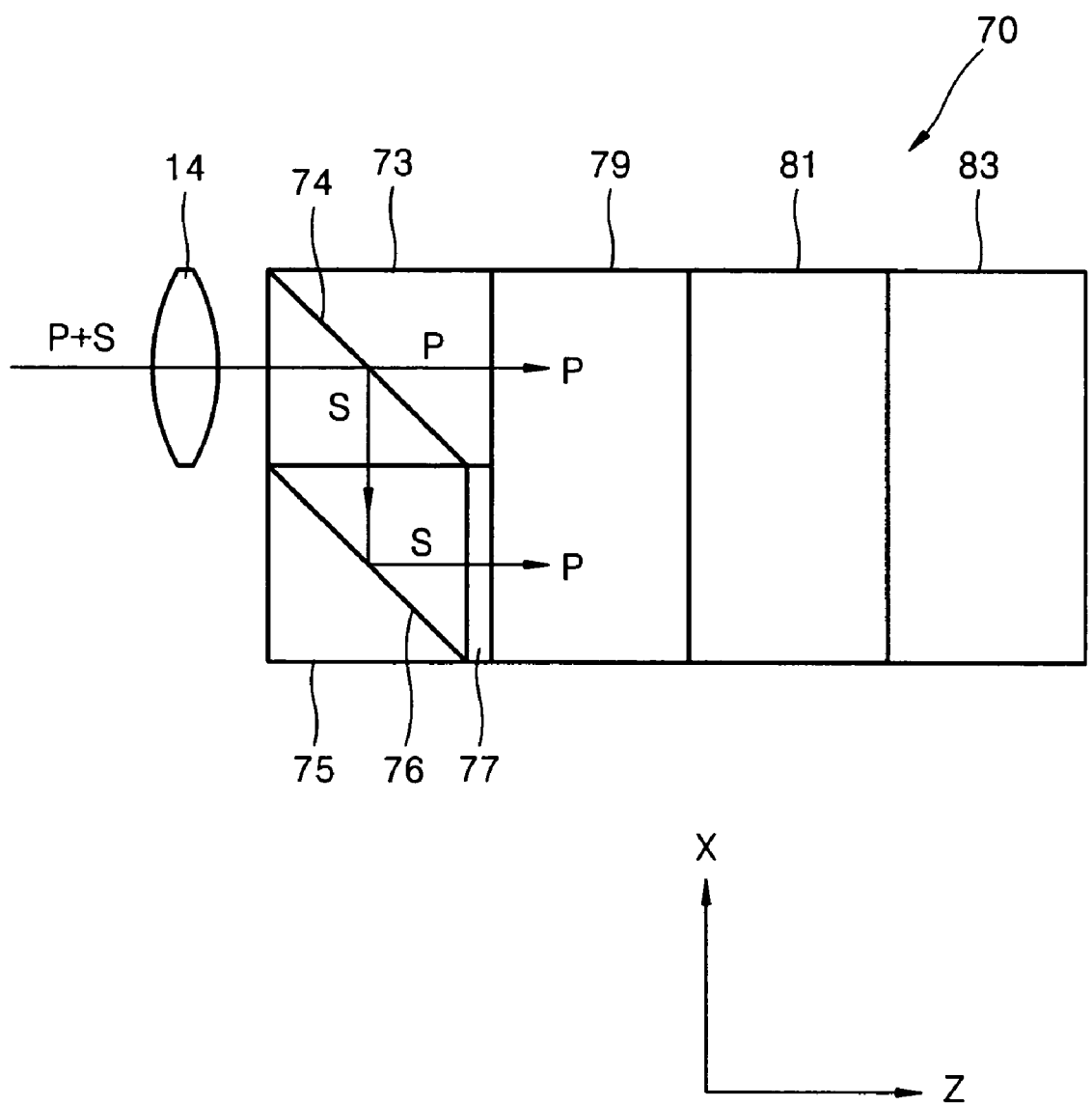
FIG. 14 is a front view of the optical pipe shown in FIG. 12.

Another example of the optical pipe 70 is illustrated in FIGS. 12 through 14. In this example, the optical pipe 70 includes first and second polarized beam splitters 73 and 75 which are disposed in an X-direction orthogonal to a Z-direction in which light proceeds, a ½ wavelength plate 77 which is disposed near to the second polarized beam splitter 75 to change the direction of polarization, and first through third dichroic prisms 79, 81, and 83 each of which reflects light having a particular wavelength and transmits light having the other wavelengths so as to split incident light I into first through third color light beams $I_1$, $I_2$, and $I_3$.

Referring to FIG. 14, the first polarized beam splitter 73 is provided on an incident surface of the first dichroic prism 79. The first polarized beam splitter 73 transmits a first light beam having one polarization among non-polarized white light incident thereonto so that the first light beam proceeds to the first dichroic prism 79 and reflects a second light beam having another polarization thereamong so that the second light beam proceeds to the second polarized beam splitter 75. For this operation, the first polarized beam splitter 73 includes a first polarization filter 74.

FIG. 14 shows an example in which when the light source 10 radiates white light in which P-polarized light is mixed with S-polarized light, the first polarization filter 74 transmits the P-polarized light and reflects the S-polarized light.

The second polarized beam splitter 75 reflects the second light beam, i.e., the S-polarized light, reflected from the first polarized beam splitter 73 so that the second light beam proceeds to the first dichroic prism 79. The second polarized beam splitter 75 simply changes the path of the second light beam without changing polarization and thus parallels the second light beam with the first light beam transmitted by the first polarized beam splitter 73. For this operation, the second polarized beam splitter 75 includes a second polarization filter 76 which reflects light having a particular polarization, for example, S-polarized light, among incident light. The second polarized beam splitter 75 may be implemented by a total reflection mirror which reflects all of the incident light.

The ½ wavelength plate 77 changes a phase of incident light having a predetermined polarization by 90 degrees so that the incident light having the predetermined linear polarization is changed into light having another linear polarization. In the example shown in FIG. 14, the ½ wavelength plate 77 is disposed between the second polarized beam splitter 75 and the first dichroic prism 79 and changes polarization such that the polarization of the second light beam becomes the same as that of the first light beam. In other words, the ½ wavelength plate 77 changes the S-polarized light reflected from the second polarization filter 76 into P-polarized light having the same polarization direction as the first light beam.

Alternatively, the ½ wavelength plate 77 may be disposed between the first polarized beam splitter 73 and the first dichroic prism 79 so as to change the polarization direction of the first light beam to be the same as that of the second light beam. Since all of the light radiated from the light source 10 can be used due to the ½ wavelength plate 77, light efficiency increases.

The light having a predetermined polarization, for example, P-polarized light, after passing through the first and second polarized beam splitters 73 and 75 and the ½ wavelength plate 77 is split into different wavelengths by the first through third dichroic prisms 79, 81, and 83. The first through third dichroic prisms 79, 81, and 83 split the incident light using first through third dichroic mirrors 80, 82, and 84, respectively, as described with reference to FIG. 11.

The optical pipe 70 shown in FIGS. 12 through 14 is suitable for a projection system using a liquid crystal display device as the light valve 30.

Referring back to FIG. 10, in the projection system having the above-described structure, scrolling is performed by the optical pipe 70 and the scrolling unit 18. Light radiated from the light source 10 is split into different color light beams by the optical pipe 70. The split different color light beams are output at different angles by the optical pipe 70 and incident onto the first cylindrical lens 17. The width of the different color light beams is decreased by the first cylindrical lens 17, and the different color light beams having the narrow width are incident onto the first spiral lens disk 20. Thereafter, a divergence angle of the different color light beams is decreased by the glass rod 23 and the second spiral lens disk 21, and then the different color light beams are incident onto the second cylindrical lens 24.

The different color light beams are paralleled with one another by the second cylindrical lens 24. Thereafter, color light beams having the same color are focused on the light valve 30 by the first and second fly-eye lens arrays 25 and 26 so that the different color light beams separately form color bars on the light valve 30. The color bars are continuously scrolled by the rotation of the first and second spiral lens disks 20 and 21 so as to form a color image. The color image formed on the light valve 30 is enlarged and projected by the projection lens unit onto the screen 40.

In the meantime, a color illuminating system according to the present invention includes the light source 10, an optical splitter which splits light radiated from the light source 10 into light beams having different wavelengths, and the scrolling unit 18 which scrolls the split light beams. The optical splitter may include the first through third dichroic filters 15a through 15c, which slant at different angles and reflects and transmits incident light according to wavelengths, or may be implemented by the optical pipe 70 described with reference to FIGS. 11 through 12.

A color illuminating system having the above-described structure splits light radiated from a light source and scrolls the split light for a single-panel projection system, thereby facilitating image formation and increasing light efficiency.

As described above, a scrolling unit according to the present invention makes scrolling of color bars possible and facilitates synchronization between scrolling and an operation of a light valve, so that scrolling can be easily controlled. In addition, since the number of component parts used to perform scrolling can be decreased, a projection system can be made light and inexpensive. A color illuminating system using a scrolling unit according to the present invention illuminates color light through a spiral lens disk, and therefore, an optical structure can be simplified, and light efficiency can be increased. Moreover, since color bars are formed using the color illuminating system, a color image can be controlled in units of color bars. As a result, picture quality can be increased.

In addition, since a projection system having the above-described structure uses a single-panel method, an optical structure can be simplified. Since the single-panel projection system uses a scrolling unit to scroll incident light, it can achieve as high light efficiency as a three-panel projection system. In other words, a single-panel projection system using a scrolling method according to the present invention splits white light simultaneously not sequentially into three color light beams and scrolls the three color light beams to form a color image, thereby achieving as high light efficiency as a three-panel projection system.

What is claimed is:

1. A scrolling unit comprising:
   a first spiral lens disk which comprises a plurality of cylindrical lens cells arranged in a spiral pattern, the first spiral lens disk being able to be rotated;
   a second spiral lens disk which is installed facing the first spiral lens disk and can be rotated at the same speed as the first spiral lens disk; and
   a glass rod which is installed between the first and second spiral lens disks.

2. A color illuminating system comprising:
   a light source which radiates light;
   an optical splitter which splits the light radiated from the light source into light beams having different colors; and
   a scrolling unit which comprises a first spiral lens disk which includes a plurality of cylindrical lens cells arranged in a spiral pattern and can be rotated, a second spiral lens disk which is installed facing the first spiral lens disk and can be rotated at the same speed as the first spiral lens disk, and a glass rod which is installed between the first and second spiral lens disks,
   wherein as the first and second spiral lens disks rotate, paths on which the light beams having different colors proceed are periodically changed, and therefore, the light beams having different colors are scrolled.

3. The color illuminating system of claim 2, wherein the optical splitter comprises first through third dichroic filters arranged side by side and slanting at different angles, each of the first through third dichroic filters selectively transmitting and reflecting incident light according to wavelengths.

4. The color illuminating system of claim 2, wherein the optical splitter comprises:
   a first dichroic prism comprising a first dichroic mirror and a first reflecting plane, the first dichroic mirror being slanted with respect to an axis of incident light, to reflect a first color light beam in the incident light, and transmit the other color light beams, the first reflecting plane totally reflecting light which is incident at a predetermined angle;
   a second dichroic prism comprising a second dichroic mirror and a second reflecting plane, the second dichroic mirror being slanted with respect to the axis of the incident light, to reflect a second color light beam in light transmitted by the first dichroic prism, and transmit the other color light beams, the second reflecting plane totally reflecting light which is incident at a predetermined angle; and
   a third dichroic prism comprising a third dichroic mirror and a third reflecting plane, the third dichroic mirror being slanted with respect to the axis of the incident light, to reflect a third color light beam in light transmitted by the second dichroic prism, the third reflecting plane totally reflecting light which is incident at a predetermined angle.

5. The color illuminating system of claim 4, wherein the optical splitter further comprises:
   a first polarized beam splitter provided on an incident surface of the first dichroic prism, the first polarized beam splitter disposed to transmit a first light beam having one polarization in non-polarized white light incident thereon so that the first light beam proceeds to the first dichroic prism and reflect a second light beam having another polarization;
   a second polarized beam splitter disposed to reflect the second light beam reflected from the first polarized beam splitter so that the second light beam proceeds to the first dichroic prism; and
   a ½ wavelength plate disposed between the first dichroic prism and one of the first and second polarized beam splitters, the ½ wavelength plate disposed to change a polarization direction so that the first and second light beams have the same polarization direction,
   thereby changing the incident light into color light beams having a predetermined polarization.

6. The color illuminating system of claim 4, wherein when the first through third dichroic mirrors slant at angles $\theta N_1$, $\theta N_2$, and $\theta N_3$, respectively, they are installed to satisfy the following formula:

$$\theta'_1 \sim > =\sim \theta'_2 \sim > =\sim \theta'_3.$$

7. The color illuminating system of claim 2, further comprising a collimating lens disposed facing an incident surface of the optical splitter, the collimating lens paralleling incident light.

8. The color illuminating system of claim 2, further comprising:
   a first cylindrical lens disposed between the optical splitter and the first spiral lens disk, the first cylindrical lens decreasing a width of light on the first spiral lens disk; and
   a second cylindrical lens disposed behind the second spiral lens disk, the second cylindrical lens paralleling light incident from the second spiral lens disk.

9. The color illuminating system of claim 8, further comprising a first fly-eye lens array and a second fly-eye lens array which focus the light beams having different colors output from the scrolling unit according to the different colors.

10. The color illuminating system of claim 9, further comprising a relay lens which transfers light having passed through the first and second fly-eye lens arrays to a predetermined location.

11. The color illuminating system of claim 2, further comprising diffractive optical elements before and behind, respectively, the scrolling unit, each of the diffractive optical elements having a predetermined diffraction pattern for focusing only light incident in a particular direction.

12. A projection system comprising:
   a light source which radiates light;
   an optical splitter which splits the light radiated from the light source into light beams having different colors;
   a scrolling unit which comprises a first spiral lens disk which includes a plurality of cylindrical lens cells arranged in a spiral pattern and can be rotated, a second spiral lens disk which is installed facing the first spiral lens disk and can be rotated at the same speed as the first spiral lens disk, and a glass rod which is installed between the first and second spiral lens disks, wherein as the first and second spiral lens disks rotate, paths on which the light beams having different colors proceed are periodically changed, and therefore, the light beams having different colors are scrolled;

a light valve which processes the light beams having different colors scrolled by the scrolling unit according to an image signal to form a color image; and a projection lens unit which enlarges and projects the image formed by the light valve onto a screen.

13. The projection system of claim 12, wherein the optical splitter comprises first through third dichroic filters arranged side by side and slanting at different angles, each of the first through third dichroic filters selectively transmitting and reflecting incident light according to wavelengths.

14. The projection system of claim 12, wherein the optical splitter comprises:

a first dichroic prism comprising a first dichroic mirror and a first reflecting plane, the first dichroic mirror being slanted with respect to an axis of incident light, to reflect a first color light beam in the incident light, and transmit the other color light beams, the first reflecting plane totally reflecting light which is incident at a predetermined angle;

a second dichroic prism comprising a second dichroic mirror and a second reflecting plane, the second dichroic mirror being slanted with respect to the axis of the incident light, to reflect a second color light beam in light transmitted by the first dichroic prism, and transmit the other color light beams, the second reflecting plane totally reflecting light which is incident at a predetermined angle; and a third dichroic prism comprising a third dichroic mirror and a third reflecting plane, the third dichroic mirror being slanted with respect to the axis of the incident light, to reflect a third color light beam in light transmitted by the second dichroic prism, the third reflecting plane totally reflecting light which is incident at a predetermined angle.

15. The projection system of claim 14, wherein the optical splitter further comprises:

a first polarized beam splitter provided on an incident surface of the first dichroic prism, the first polarized beam splitter disposed to transmit a first light beam having one polarization in non-polarized white light incident thereon so that the first light beam proceeds to the first dichroic prism and reflect a second light beam having another polarization;

a second polarized beam splitter disposed to reflect the second light beam reflected from the first polarized beam splitter so that the second light beam proceeds to the first dichroic prism; and a ½ wavelength plate disposed between the first dichroic prism and one of the first and second polarized beam splitters, the ½ wavelength plate disposed to change a polarization direction so that the first and second light beams have the same polarization direction, thereby changing the incident light into color light beams having a predetermined polarization.

16. The projection system of claim 14, wherein when the first through third dichroic mirrors slant at angles $\theta N_1$, $\theta N_2$, and $\theta N_3$, respectively, they are installed to satisfy the following formula:

$$\theta'_1 \sim > = \sim \theta'_2 \sim > = \sim \theta'_3.$$

17. The projection system of claim 12, further comprising a collimating lens disposed facing an incident surface of the optical splitter, the collimating lens paralleling incident light.

18. The projection system of claim 12, further comprising:

a first cylindrical lens disposed between the light source and the first spiral lens disk, the first cylindrical lens decreasing a width of light on the first spiral lens disk; and a second cylindrical lens disposed behind the second spiral lens disk, the second cylindrical lens paralleling light incident from the second spiral lens disk.

19. The projection system of claim 18, further comprising a first fly-eye lens array and a second fly-eye lens array which focus the light beams having different colors output from the scrolling unit on the light valve according to the different colors.

20. The projection system of claim 19, further comprising a relay lens which transfers light having passed through the first and second fly-eye lens arrays to the light valve.

21. The projection system of claim 12, further comprising diffractive optical elements before and behind, respectively, the scrolling unit, each of the diffractive optical elements having a predetermined diffraction pattern for focusing only light incident in a particular direction.

* * * * *